United States Patent [19]
Lubbers et al.

[11] Patent Number: 5,659,739
[45] Date of Patent: Aug. 19, 1997

[54] SKIP LIST DATA STRUCTURE ENHANCEMENTS

[75] Inventors: Clark E. Lubbers, Colorado Springs; Susan G. Elkington, Black Forest; Richard F. Lary, Colorado Springs, all of Colo.

[73] Assignee: Digital Equipment Corporation, Maynard, Mass.

[21] Appl. No.: 538,113

[22] Filed: Oct. 2, 1995

[51] Int. Cl.$^6$ ............................................. G06F 17/30
[52] U.S. Cl. ................................. 395/613; 395/611
[58] Field of Search ............................ 395/611, 612, 395/613

[56] References Cited

U.S. PATENT DOCUMENTS

| | | | |
|---|---|---|---|
| 4,603,380 | 7/1986 | Easton et al. | 364/200 |
| 5,261,088 | 11/1993 | Baird et al. | 395/600 |
| 5,263,160 | 11/1993 | Porter, Jr. et al. | 395/600 |
| 5,285,528 | 2/1994 | Hart | 395/725 |
| 5,301,290 | 4/1994 | Tetzlaff et al. | 395/425 |

OTHER PUBLICATIONS

William Pugh, "Skip Lists: A Probabilistic Alternative to Balanced Trees", Communications of the ACM, Jun. 1990, vol. 33, No. 6, pp. 668–676.

William Pugh, "Efficient Concatenable Ordered Lists", TR 87–831, Cornell University (1987).

Robert Sedgewick, *Algorithms*, Addison–Wesley Publishing Co. (1988), pp. 15–33, 193–212.

Jeffrey Esakov and Tom Weiss, *Data Structures*, Prentice–Hall, Inc. (1989), pp. 54–65, 184–191.

William Pugh, "A Skip List Cookbook" Jul. 1989 pp. 1–14.

*Primary Examiner*—John C. Loomis
*Attorney, Agent, or Firm*—Ronald C. Hudgens; Cathy L. Peterson

[57] ABSTRACT

A system and technique for optimizing the efficiency of maintenance operations performed on skip lists of data elements or nodes stored in memory is provided. Each node of a skip list includes a back pointer for pointing to an immediate predecessor node and a node level field for recording the node level associated with the node. The system further includes a system agent for operating on the data structure, the system agent capable of locating the address of the immediate predecessor node pointing to a selected node by using the back pointer in the selected node.

11 Claims, 6 Drawing Sheets

SKIP LIST DATA STRUCTURE ENHANCEMENTS

FIELD OF THE INVENTION

The present invention relates generally to performing maintenance operations on a data structure stored in a digital computer memory, and in particular, to an enhanced skip list data structure and improved method of inserting or deleting data elements contained or referenced therein.

BACKGROUND OF THE INVENTION

A critical problem in many applications is the ability to locate a specific data item in a stored set of data items in an efficient manner. One well-known and widely used solution is the binary tree. The performance of binary tree routines is, on average, very good, but suffers when data manipulation is not localized. The insertion or removal of data in order, for example, can produce an unbalanced tree structure, thus leading to extremely poor search performance. Consequently, after an insertion or deletion, a tree must be rebalanced if an imbalance has been introduced. Specific balanced tree techniques, such as AVL trees, have been designed to rearrange the tree to correct imbalances which occur as operations are performed, but may incur a compute overhead unacceptable to some applications. In cache controller applications, for example, a cache manager is expected to dynamically delete as well as add cache index entries to the caching data structures. The extra overhead required for such operations may be unacceptable in the cache controllers of embedded control systems, like storage controllers, having real-time performance constraints.

Skip lists, a variant of linked linear lists, provide yet another approach. Specific information on skip lists and related algorithms is presented and discussed at some length in a paper by William Pugh, entitled "Skip Lists: A Probabilistic Alternative to Balanced Trees", Communications of the ACM. June 1990, pp. 668–676. In this paper, Professor Pugh suggests skip lists as a performance-enhanced alternative to balanced trees for situations requiring the frequent insertion or removal of keyed items in an ordered search structure.

Essentially, a skip list is an ordered, linked linear list of list elements, or nodes, in which some nodes contain extra pointers that skip intermediate nodes, thus increasing the speed of searches. A node with i extra forward pointers is known as a level i node. The pointers of a level i node are indexed from 0 to i; the pointer at index i in the node points to the next node of level i or greater in the list, according to the ordering scheme of the list. Thus, the pointer at index 0 of a node always points to the next node, but the pointer at index 2 of a node will point to the next node of level 2 or higher. The level of a node, from 0 to some maximum M which is a property of the skip list, is assigned when it is inserted into the skip list. A random number generator is used, causing the probability of a node being at level L or higher to be $1/(b^L)$, where b is a property of the skip list. Hereafter, a base of b=4 is assumed; however, the choice of b (as well as M) is up to the implementer.

Like other linked list data structures, skip lists generally begin with a "list head" which points to the first node in the list. In the case of skip lists, however, the list head has M pointers, indexed in the same way as for any node in the skip list.

Skip lists have the following properties: search time proportional to log(#entries); insertion time proportional to log(#entries); delete time proportional to log(#entries); and extremely simple code—approximately ¼ the size of an AVL tree implementation. Each entry of a search structure needs room for a maximum of M pointers; the best performance will be obtained when M>= log[base b] (maximum number of entries in the list), although a smaller value of M will work with reduced performance to realize the above performance, although fewer pointers will work with a reduced performance. If variable-size entries are allocated, the average number of pointers actually used per entry is less than two, which is less memory overhead than used by AVL trees.

Certain algorithms, specifically insertions and deletions, can present difficulties when performed on linked lists. Generally, deleting a node requires a traversal of the list until the correct node is found. Once located, the pointer from the previous node is made to point to the next node (i.e., the node following the "removed" node). Therefore, there must be some way to keep track of which node precedes the node to be deleted. Similarly, adding a node to a linked list requires that the address of the node examined prior to reaching the insertion point be saved, since the only way to determine the correct insertion point is to pass it. Thus, special accommodations must be made to maintain such information. One technique utilized for a singly linked list, for example, is to maintain a separate pointer to point to the forward pointer of the predecessor node. Another solution involves the use of a doubly linked list, in which each node is linked to both of its neighboring nodes. Further information on linked list data structures and methods for performing basic operations thereon may be had with reference to such text books as "Data Structures: An Advanced Approach Using C" by Jeffrey Esakov and Tom Weiss (Prentice Hall, 1989), and "Algorithms" by Robert Sedgewick (Addison-Wesley, 1988).

The problem discussed above becomes significantly more complex when skip lists are used, as there may be more than one node pointing to the node being inserted or deleted. For insert and delete operations in skip lists, then, there is a search cost proportional to the level of the node being inserted or deleted. Typically, a skip list search routine must maintain an array of predecessor pointers, one for each level, in case an insertion is required. If the ratio of insertions to searches is significant (more than a few percent), the extra time maintaining this pointer array on all searches will be comparable to or less than the time needed to specifically contruct that array for insertions.

There are, however, special cases where insert operations do not follow searches. In a cache control application, for example, a cache manager will perform an insertion which does not follow a search when it needs to split a cache node for transfer alignment purposes. More particularly, node splitting is encountered in RAID controllers, where alignment is needed for reconstruct-write RAID operations. Hence, there is a need for some type of mechanism which will ensure that the insertions in such special cases are constant as well.

There are also applications of skip lists where a node removal is performed without a preceding search. For instance, node removal in a cache control application performed on the basis of a Least Recently Used algorithm does not follow a search. Remove time accounts for approximately 25% of the list maintenance overhead assuming a 50% cache hit ratio. If remove operations frequently followed searches, remove time would be a small constant. However, frequency of removes is almost identical to the frequency of cache misses. Hence, a remove algorithm could greatly benefit from the utilization of a data structure enhancement to reduce the remove time to a small constant plus another small value proportional to log(#entries).

SUMMARY OF THE INVENTION

Accordingly, it is an object of the present invention to provide a mechanism for optimizing the efficiency of maintenance operations performed on skip lists of data elements or nodes stored in computer system memory.

The above and other objectives are attained by a system including a data structure and a method of operating on such data structure, the data structure being organized as a skip list of nodes. Each node holds one or more forward pointers, indexed from a lowest to highest index, for pointing to successor node(s). At least one forward pointer in each node points to the immediate successor node of that node. According to the present invention, each node is provided with a back pointer for pointing to the immediate predecessor node, and a node level field for recording a node level associated with that node. The system further includes a system agent for operating on the data structure, the system agent capable of directly locating the forward pointer of the immediate predecessor node pointing to a selected one of the nodes by following the back pointer in the selected node.

In another aspect of the present invention, a search is performed when the node level of the selected node is not the lowest index or level, and the selected node is a node to be deleted. As each level of the search terminates by determining the node which points to the node at or above that level with the lowest key which is greater than or equal to the key of the node to be deleted (the "search key"), a check is made to determine if that node points to the node to be deleted. It is implicit in the structure of the list that that node will point to the node to be deleted if the current search level is less than or equal to level of the node to be deleted. If it is, the forward pointer at the given index (or level) in that node is modified by copying the forward pointer at the given index (or level) in the node to be deleted to it.

The enhanced data structure and technique of the present invention offer several advantages. First, remove time is a constant when a node to be removed is a lowest level node (which is approximately 75% of the time) because the required search has been eliminated. That is, there are only two pointers to be modified—one in the immediate predecessor node and the other in the immediate successor node—and can be determined directly. The update of pointers is placed inside the search loop, also simplifying the remove operation considerably. If the node to be inserted is forced to a lowest level, the insertion time is also constant because the only pointers to be modified can be ascertained directly. Moreover, node lists can be traversed quickly in reverse order from a given point. This is particularly useful when aggregating writes during a cache flush. Lastly, the logic associated with insertion/deletion operations as well as searches consumes so little code space that it can be duplicated in-line rather than called in many places, especially in critical paths.

BRIEF DESCRIPTION OF THE DRAWINGS

The above objects, features and advantages of the present invention will become more apparent from the following detailed description taken in conjunction with the accompanying drawings, in which.

DESCRIPTION OF THE PREFERRED EMBODIMENT

Figure 1:
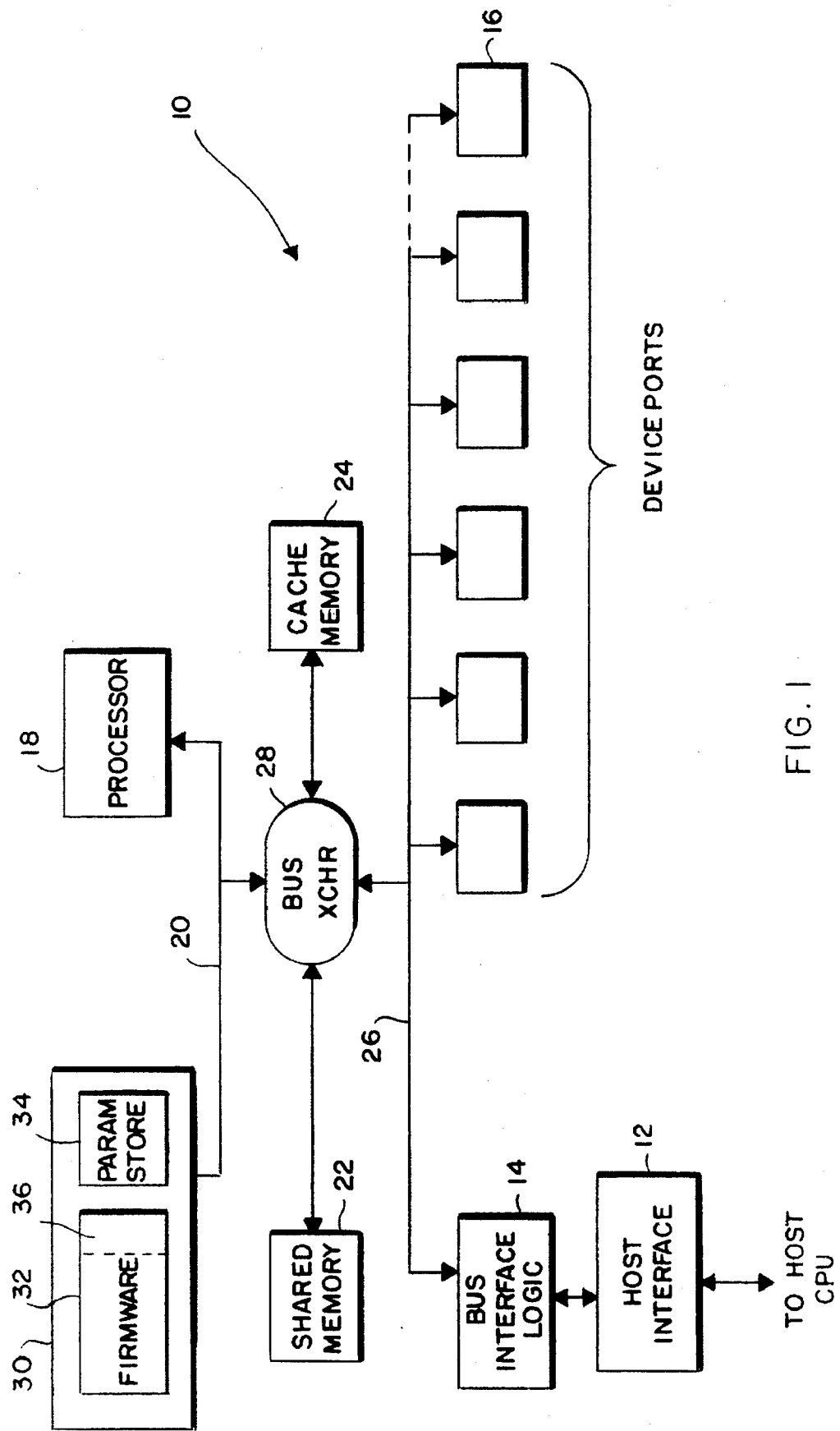
FIG. 1 is a general block diagram of a storage controller in a digital computer system utilizing the present invention.

An example of a digital computer system environment which utilizes the present invention is a storage controller 10, as illustrated in FIG. 1. Referring to FIG. 1, the storage controller 10 bridges a host interface 12 via a bus interface logic block 14 to one or more device ports 16, which provide an access path to a physical media (not shown). The controller 10 further includes a processor 18, residing on a native bus 20. Also included are a shared memory 22, which includes buffer memory and control functions, and a cache memory 24. Separate buses containing the shared memory 22 and cache memory 24 are interconnected to the native bus 20 and a bus 26 used to access the host interface through the bus interface logic block 14 and device ports 16 by way of a bus exchanger 28. The bus exchanger is a crossbar which provides fast access by all entities to all parts of the controller. In addition to providing required bus interface logic, the bus interface logic block 14 may also include and thus represents other functional components typically needed to perform low level device and host port operations support.

Sharing the native bus 20 used by the processor is a nonvolatile memory 30. The nonvolatile memory 30 stores the controller firmware 32 and parameter data 34, and is read each time the controller boots. Included as a subcomponent of the firmware is the caching firmware, shown simply as a system agent 36. Although the firmware is contained in the nonvolatile memory 30, it is copied to the shared memory 22 at initialization for subsequent execution. Stored in the shared memory 22 are certain caching data structures, which are created and maintained by the system agent 36. Some of the caching data structures are organized as skip lists of nodes, each node containing information which describes a portion of the cache data stored in the cache memory 24, in accordance with the principles of the present invention.

The system as thus described with reference to FIG. 1 is intended to illustrate only those aspects of the storage controller which pertain to the present invention. Hence, some functions are omitted and others simplified to a level appropriate to a discussion of the present invention. Nor is the scope of the invention limited by the particular features of the illustrated system. The principles of the present invention are generally applicable to any digital computer system having a skip list data structure in memory and a device or agent for manipulating such a data structure.

Figure 2:
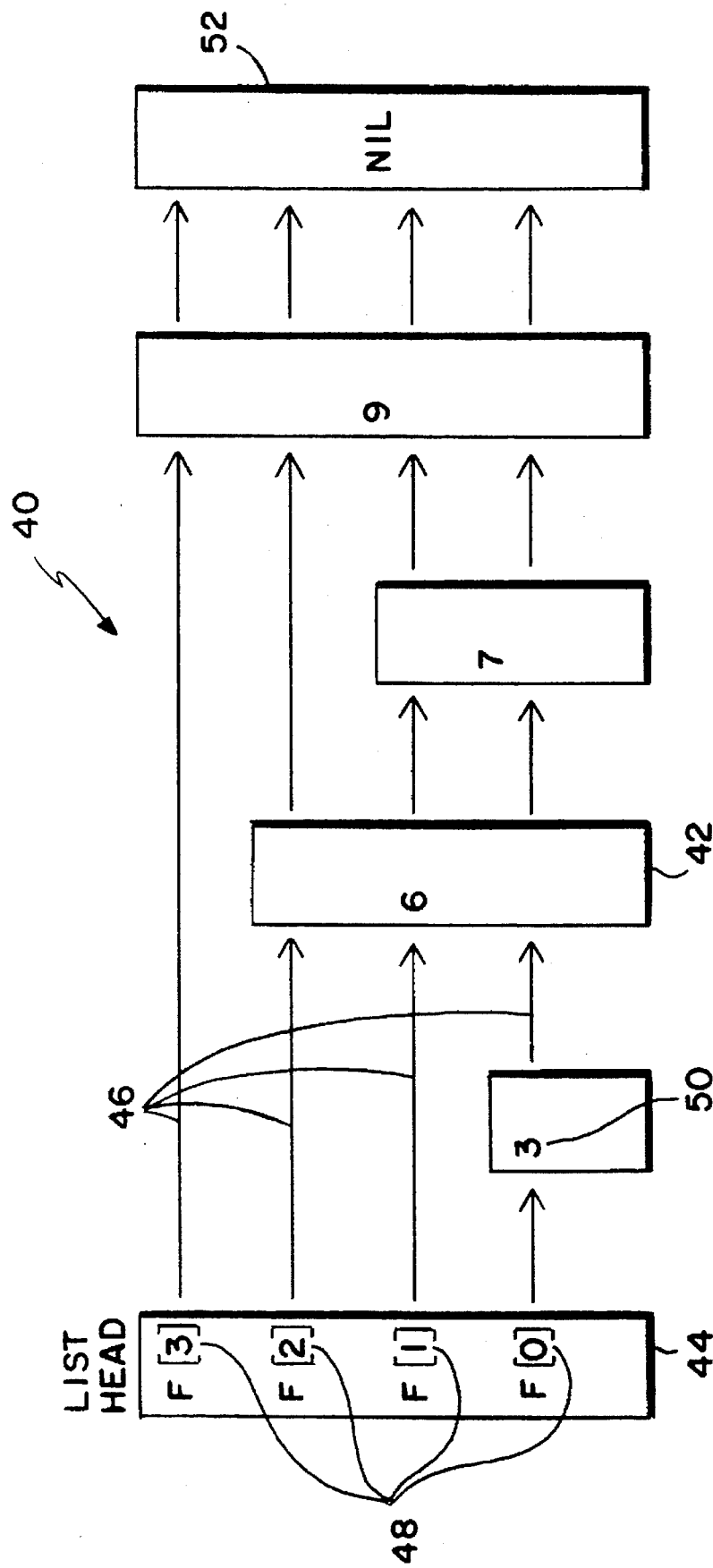
FIG. 2 is an illustration of a prior art four-level skip list data structure.

FIG. 2 illustrates a typical skip list data structure 40. It is a generic, four-level skip list having four data elements or "nodes" 42 and a list head 44 which points to the list. The list head 44 provides a plurality of forward pointers 46 indexed lowest to a maximum number 48, the index thus indicating the level within the list of a given one of the forward pointers 46. In the example shown, the lowest index is "0" and the maximum index is "3". Here, the maximum index is the maximal level of the list; however, the maximum index may actually be higher that the list level in some lists if the pointers at all levels are not being used. Each node or data element 42 has an assigned key 50, used by the system agent during search operations.

Contained in each node 42 shown in FIG. 2 are one or more of the forward pointers 46, each of the forward pointers linking such node to a successor node. At least one of the forward pointers 46 allocated to each node 42 points to an "immediate" successor node, which is the successor node immediately adjacent to such node and corresponds to the lowest index. The number of forward pointers allocated to any given node is determined probabilistically at insertion time. The level associated with each node 42 is, then, the highest of the indices corresponding to its allocated forward pointers. Each of the forward pointers 46 in a given node links such node to a next node of node level at least as great as the forward pointer index. Being so linked, that next node thus becomes a successor node with respect to the given node. Again, reference may be had to the article by William Pugh, entitled "Skip Lists: A Probabilistic Alternative to Balanced Trees", Communications of the ACM, June 1990, pp. 668–676, for further information on skip lists and, more particularly, node level generation.

With continued reference to FIG. 2, the end of the list is indicated by a stored null or "NIL" value 52. This null value may point to a dedicated "NIL" node, which serves to terminate the list and is distinguished by having a key which is greater than any possible real key. Such a "NIL" node is described in the Pugh paper. Alternatively, a null pointer "NULLPTR" (value=0) may be used in a particular node to indicate that the next node is, in that given instance, the NIL node. Consequently, the algorithm must check the pointer in each node to determine if it is the NULLPTR and, if it is, take appropriate measures "as though" the next node has a key greater than the search key.

Figure 3:
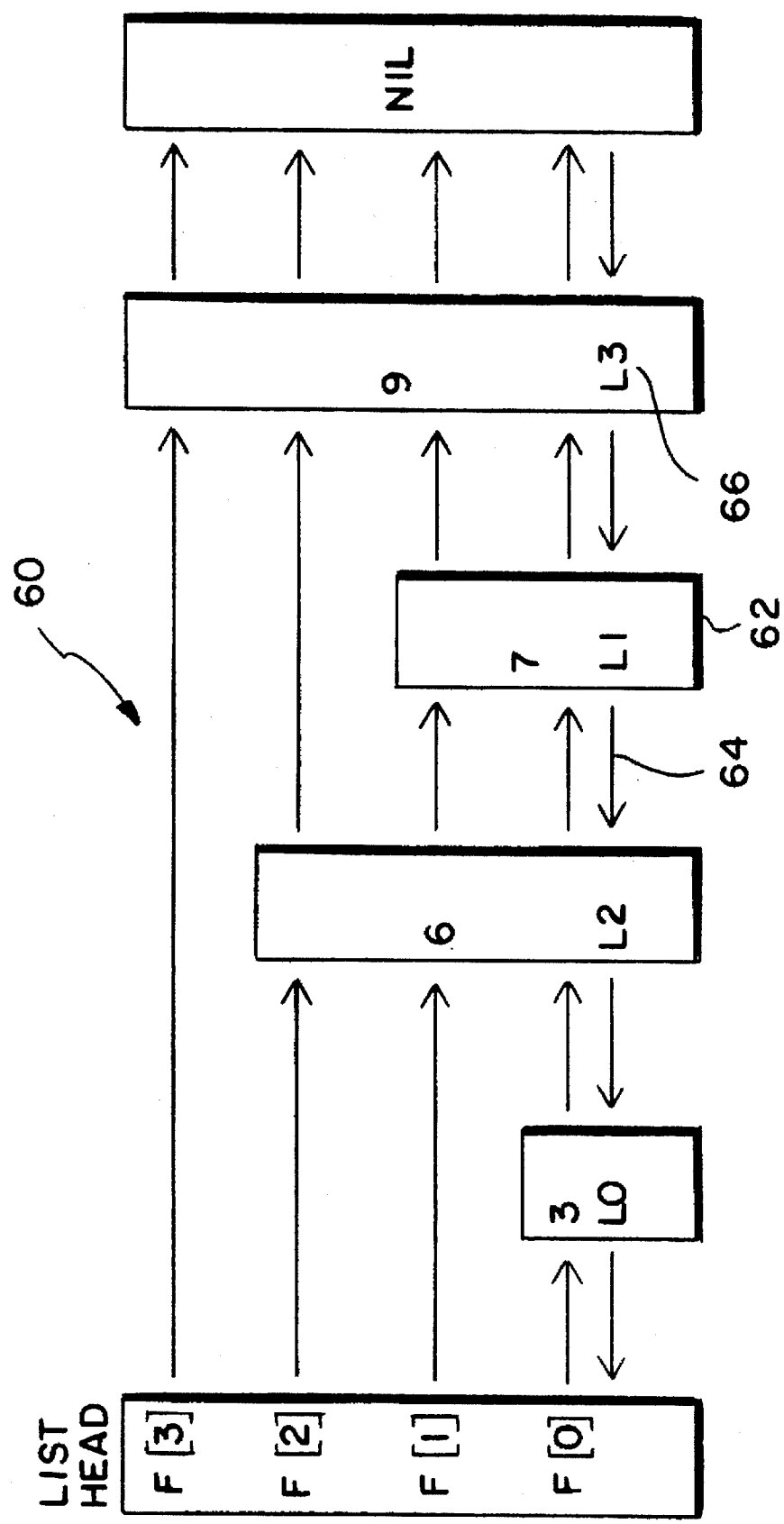
FIG. 3 is an illustration of a four-level skip list data structure in accordance with a preferred embodiment of the present invention.

FIG. 3 presents a skip list data structure in accordance with the principles of the present invention. The skip list 60 illustrated in FIG. 3 has the features of the example shown in FIG. 2, but incorporates two significant enhancements. Each node 62 has a back pointer 64, which links such node to a predecessor node. In the preferred embodiment, the back pointer points to the immediate predecessor node (i.e., the immediately adjacent predecessor node). Further, each node 62 stores a node level 66 (represented in FIG. 3 as "Ln", where n denotes the index of the highest level forward pointer in that particular node) as previously defined with respect to FIG. 2. If the forward pointers in a node are indexed from 0 to i and every node has a level 0 forward pointer, then n is the number of extra pointers allocated to the node. In the preferred embodiment, it is desirable to employ a NULLPTR to point to the NIL node as discussed above. If an actual NIL node is used, it becomes necessary to include one NIL node per list since each NIL node's back pointer would be unique to its own list. Thus, the cost of the additional pointer check is traded off against the saving of extra fetches from memory. The use of the back pointer in the NIL node can be eliminated, but to do so requires special treatment when a successor node is the NIL node.

Therefore, and in accordance with the principles of the present invention, a back pointer pointing to an immediate predecessor node and a node level for indicating the level of a node are stored in each node of a skip list. Each node is provided with two additional information fields, one for holding the back pointer and the other for recording the node level, in memory. It is generally understood that the amount (number of bytes) of memory space occupied by a given field and the organization of that space are implementation details which can vary with system design. Therefore, no further discussion of such details is provided herein.

Given that a node to be removed is known or a node to be inserted before (immediate successor node) or after (immediate predecessor node) is known, the invention allows modifications to several basic algorithms. First, if the node to be removed is lowest level (i.e., level 0), which is approximately 75% of the time using an optimized algorithm, the remove time is constant because it requires no search. The only pointers to be modified are in the immediate predecessor and immediate successor nodes, which can be located directly using the back pointer and the forward pointer, respectively. Since the removal of a node is based on a node which is known and not a value which may be missing, the update of pointers can be placed inside the search loop. Thus, the remove operation is simplified considerably. Second, if the node to be inserted is forced to the lowest level, the insert time is constant because it requires no search. Again, the only pointers to be modified are in the immediate predecessor and successor nodes, both of which are known. An instance in which the system agent performs an insertion that does not follow a search is when a cache node must be split for purposes of transfer alignment. Forcing a node to the lowest level in this situation has minimal effect on the search time since the two nodes are adjacent within the "key space". It should be noted, however, that using this "quick" insert technique for every node splitting operation can, in certain cases, result in all nodes being forced to the lowest level. Consequently, a probablistic approach to its utilization is preferable. Third and last, node lists can be traversed quickly in reverse order from a given point. This is useful when aggregating writes during a cache flush, for example.

Figure 4:
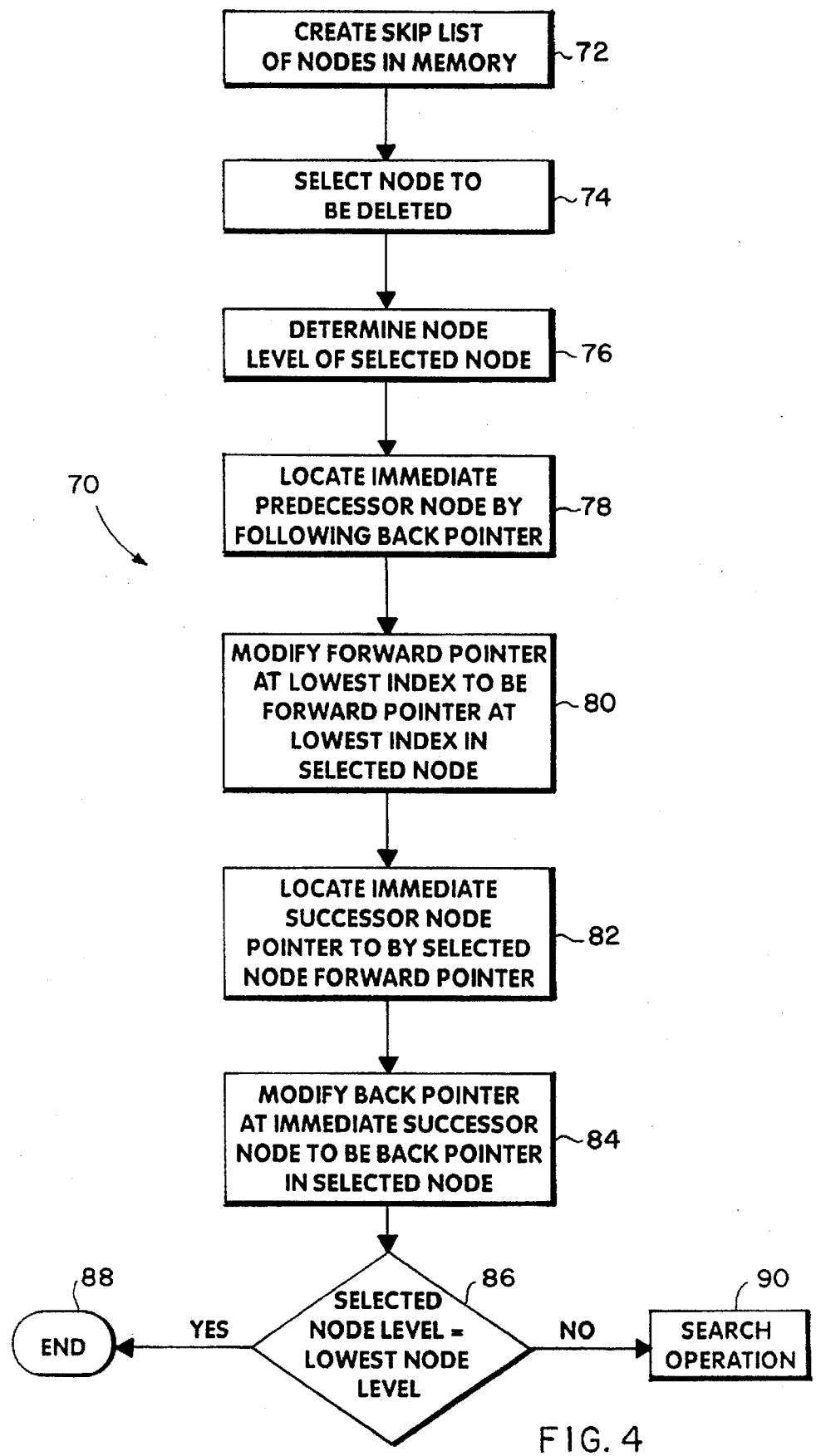
FIG. 4 is a flow diagram illustrating the manner in which a data element is deleted from a skip list data structure according to the principles of the present invention.
Figure 5:
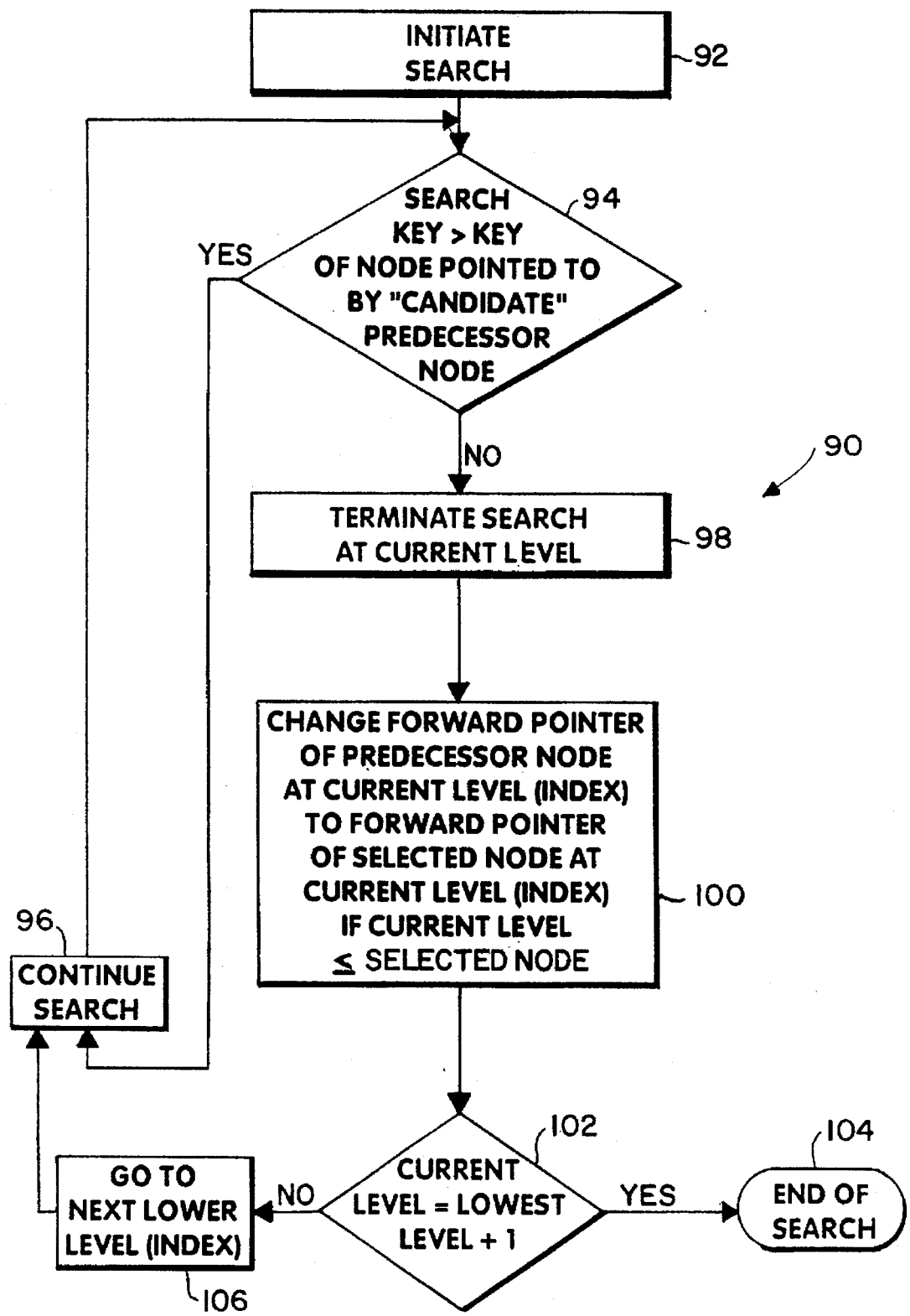
FIG. 5 is a flow diagram illustrating in detail step 90 shown in FIG. 4.

The utility of the enhanced skip list data structure as thus described may be further appreciated through a discussion of some key aspects of its use during basic operations, as illustrated in FIGS. 4–5. With reference to FIG. 4, a flow diagram illustrating the manner in which the system agent operates on the skip list, utilizing the back pointer and the recorded node level to improve efficiency of search time associated with a deletion operation 70, is provided. After a skip list of nodes has been created 72, the nodes having the attributes described with reference to FIG. 3, data elements (or nodes) need to be dynamically removed from the list. Upon selecting the node to be deleted 74, the system agent checks the node level field in the selected node to determine its node level 76. The immediate predecessor node is located by following the back pointer of the selected node 78. Subsequently, the forward pointer at the lowest level (lowest index) in the immediate predecessor node pointing to the selected node is modified to point to the immediate successor node to the selected node 80. In other words, the forward pointer is changed to the forward pointer at the lowest index of the selected node. This is accomplished by copying the forward pointer in the lowest level forward pointer field of the selected node to the same field in the immediate predecessor node in known fashion. Additionally, the back pointer of the immediate successor node, located by following the forward pointer of the selected node 82, is changed to point to the immediate predecessor node (i.e., changed to the back pointer of the selected node) 84. If the node level of the selected node as determined by step 76 is the lowest node level 86, then the operation is complete 88. If the node level is not the lowest level 86, then a search operation is performed 90. The purpose of the search operation is to locate the predecessor nodes which point to the selected node so that the forward pointers in such predecessor nodes can be updated.

The steps of the search 90 are illustrated in the flow diagram presented in FIG. 5. Referring to FIG. 5, the search execution begins 92. Typically, the search starts at the maximum index or list level with the forward point at that level in the list head. The object of the search at a given level is to locate the node pointing to the node with the lowest key greater than or equal to the search key (selected node key). Thus, if the search key of the selected node is greater than the key of the node to which a "candidate" predecessor node (i.e., the node currently being examined) points via its forward pointer at the current index (or level), the search continues 96 with a new candidate predecessor node. The new candidate predecessor node is the next node pointed to by the forward pointer at the current index (or level) of the current candidate predecessor node. Otherwise, the search at the current level is terminated 98. Note that if the candidate predecessor node points to the NIL node the search at the current level will terminate because the key of the NIL node is implicitly greater than all keys. As each level of the search is terminated, the forward pointer of the predecessor node at the current level (index) is modified to be the same as the forward pointer of the selected node at the current level (index), i.e., pred->forward[index]=this_to_delete->forward [index]. This update will occur if the current level is less than or equal to the selected node level.

The purpose of a standard search at each level is to determine the predecessor node at that level for a given key (whether or not a node with that key is present). In the case of a delete, a node whose key is the search key is known to exist as the search key is the key of the node to be deleted. That is, the node to be deleted is known to be in the list. Unlike the standard search, then, there is no need to save the forward pointer. Rather, the forward pointer can be directly updated as thus described. If the current level of search is at the next to lowest level (lowest level+1) at this point 102, the search operation is terminated 104 as the lowest level pointer manipulations were already performed prior to the search in steps 78-80 in FIG. 4. If the next to lowest level has not yet been reached, the search moves to the next lower level 106 and continues or resumes the search 96 at that level (now the current level) as previously discussed. Once the steps illustrated in FIGS. 4 and 5 are completed, the selected node is effectively bypassed. Details of a standard skip list search algorithm can be found on pp. 669-670 of the previously-referenced Pugh article.

The enhanced skip list of the present invention has no effect on a standard insert, which typically follows a search that has failed. A search fails if the node with the specified key does not exist in the list. Because the cost of storing pointers during a standard search is so low, the pointers are always stored. For each level (starting at the level of the highest level node in the list), the standard search algorithm stores a pointer to the node which points to the node with the lowest key that is greater than or equal to the key being searched for. In no case will this be the NULLPTR. If the list is empty, for example, all pointers will point to the list head (which is formatted in terms of offsets of pointers like a node). If the node with the specified key is not located by the search, the array of pointers (indexed by level) is used to locate precisely the nodes whose forward pointers must be modified. Based on the level of the node to be inserted, the forward pointers (at the given index) of the nodes in this array at or below the level selected are modified to point to the inserted node after copying them to the forward pointer at the given index of the inserted node. Thus, an insert immediately following a search does not require an additional search.

Figure 6:
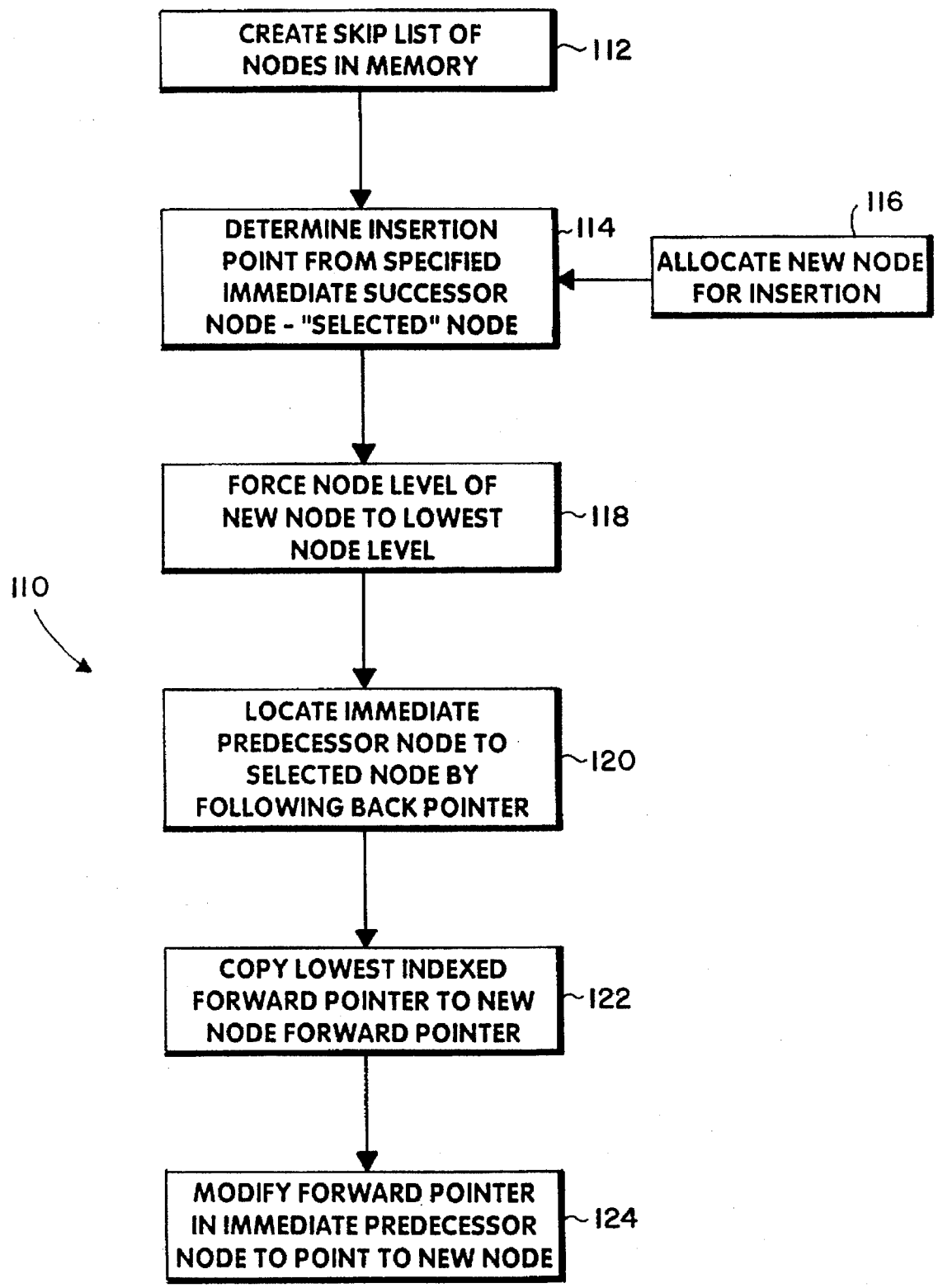
FIG. 6 is a flow diagram illustrating the manner in which a data element is inserted into a skip list data structure according to the principles of the present invention.

In contrast, the skip list enhancements of the present invention can improve efficiency of insert operations which require that a node be inserted after or before a specific node selected by a mechanism other than a search. In the case of node splitting, a specified node address determines the point of insertion. The node specified may be either a node immediately following the insertion location (immediate successor node) or a node immediately preceding the insertion location (immediate predecessor node). FIG. 6 presents a flow diagram depicting an insertion process 110 which does not follow a search. Referring to FIG. 6, a list of nodes is created 112, the nodes having the attributes described with reference to FIG. 3, and data elements (or nodes) need to be dynamically added to the list. Having determined the point of insertion in reference to a specified immediate successor node (designated as the "selected" node) 114 and allocating a new node for insertion 116, the system agent performs a "quick" insert by forcing the node level of the new node to the lowest level (e.g., zero) 118. As a result, the only pointers to be updated are in the immediate predecessor and successor nodes, which are directly located without a search. After locating the immediate predecessor node by following the back pointer of the selected node 120, the lowest indexed forward pointer of the immediate predecessor node is copied to the new node 122. That same forward pointer in the immediate predecessor node is then modified to point to the new node 124.

Although it is not shown in FIG. 6, the node insertion operation for a list of nodes with back pointers would also require that the back pointer of the selected node (node after insertion location) be copied to the back pointer of the new node. Further, the back pointer of the selected node must also then be updated to point to the new node. It can be appreciated that the pointer manipulations are the same for the quick insert when the specified or selected node is the immediate predecessor node. If the immediate predecessor node is specified, however, it is the immediate successor node which is located in step 120. It is located by following the lowest indexed forward pointer of the immediate predecessor node.

Although the above description has proceeded with reference to a specific embodiment of the invention, the invention is not necessarily limited to the particular embodiment shown herein. It is to be understood that various other adaptations and modifications may be made within the spirit and scope of the invention as set forth by the claims.

What is claimed:

1. A method for operating on a data structure comprising:

storing a data structure in a memory, said data structure including a skip list of nodes, each of said nodes including one or more forward pointers, each of said forward pointers for pointing to a successor node, at least one of said forward pointers pointing to an immediate successor node, said forward pointers being indexed from a lowest to a highest index, a back pointer for pointing to an immediate predecessor node, and a node level field for recording a node level associated with said each node, said node level corresponding to a highest index of said indexed forward pointers allocated to said each node;

locating said immediate predecessor node by following said back pointer in a selected one of said nodes;

changing in said immediate predecessor node said forward pointer having said lowest index to said forward pointer having said lowest index in said selected one of said nodes;

locating said immediate successor node by following said forward pointer in said selected one of said nodes; and changing in said immediate successor node said back pointer to said back pointer in said selected one of said nodes.

2. A method for operating on a data structure according to claim 1 further comprising:

if said node level is not said lowest index, then performing a search of said skip list of nodes to locate each of said forward pointers which points to said selected node and requires updating.

3. A method for operating on a data structure according to claim 2, wherein said step of performing a search of said skip list of nodes comprises:

searching at a current level using a search key corresponding to said selected node by examining each node as a candidate predecessor node to determine if the search key is greater than the node pointed to by the forward pointer of said candidate predecessor node at said current level;

continuing said searching at said current level if said search key is greater; and otherwise, terminating said search at said current level and changing in said predecessor node said forward pointer having an index corresponding to said current level to said forward pointer in said selected one of said nodes having an index corresponding to said current level if said current level is less than or equal to said level of said selected one of said nodes.

4. A method for operating on a data structure according to claim 3, wherein said step of performing a search of said skip list of nodes further comprises:

determining if said current level corresponds to an index one higher than said lowest index;

if said current level is determined to correspond to an index one higher than said lowest index, then terminating said search; and otherwise, continuing said search at a next lower level.

5. A method for operating on a data structure comprising:

storing a data structure in a memory, said data structure including a skip list of nodes, each of said nodes including one or more forward pointers, each of said forward pointers for pointing to an immediate successor node, said forward pointers being indexed from a lowest to a highest index, a back pointer for pointing to an immediate predecessor node, and a node level field for recording a node level associated with said each node, said node level corresponding to a highest index of said indexed forward pointers allocated to said each node;

determining a desired insertion point, said insertion location preceding in said list a selected one of said nodes;

allocating a new node to be inserted into said skip list of nodes;

forcing said node level of said new node to said lowest level;

locating said immediate predecessor node, said immediate predecessor node being pointed to by said back pointer of said selected one of said nodes;

copying said forward pointer having said lowest index in said immediate predecessor node to said new node; and modifying in said immediate predecessor node said forward pointer to point to said new node.

6. A digital computer system comprising:

a memory;

a data structure stored in said memory, said data structure including a skip list of nodes, each of said nodes including one of more forward pointers, each of said forward pointers for pointing to a successor nodes, at least one of said forward pointers for pointing to an immediate successor node, said forward pointers being indexed from a lowest to a highest index, a back pointer for pointing to an immediate predecessor node, and a node level field for recording a node level associated with said each node, said node level corresponding to said highest index of said indexed forward pointers allocated to said each node;

a system agent for operating on said data structure, said system agent following said back pointer in a selected one of said nodes to locate said forward pointer of said immediate predecessor node pointing to said selected one of said nodes.

7. A digital computer system according to claim 6, wherein said selected one of said nodes is a node to be deleted from said skip list of nodes and said system agent changes in said immediate predecessor node said forward pointer having said lowest index to said forward pointer in said selected one of said nodes.

8. A digital computer system according to claim 6, wherein said selected one of said nodes is said immediate successor node to a new node inserted into said skip list and said system agent copies from said immediate predecessor node said forward pointer having said lowest index to said new node and modifies said forward pointer having said lowest index to point to said new node.

9. A system having a data structure stored in memory, the data structure organized as a skip list of nodes, comprising:

one or more forward pointers in each of said nodes for pointing to a successor node, said forward pointers being indexed from a lowest to a highest index;

a back pointer in said each node for pointing to an immediate predecessor node;

a node level stored in said each node, said node level corresponding to said highest index of said indexed forward pointers allocated to said each node; and a system agent for operating on said data structure, said system agent utilizing said back pointer in a selected one of said nodes to locate said forward pointer of said immediate predecessor node pointing to said selected node.

10. A data structure stored in memory, the data structure organized as a skip list of nodes, comprising:

at least one forward pointer in each of said nodes for pointing to an immediate successor node and one or more additional forward pointers, each of said additional forward pointers for pointing to a successor node;

a back pointer in said each node, said back pointer pointing to an immediate predecessor node; and a node field in said each node for recording a node level associated with said each node, said node level corresponding to the number of said additional forward pointers allocated to said each node.

11. A data structure stored in a memory organized as a skip list of nodes comprising:

at least one forward pointer in each of said nodes for pointing to a successor node;

a back pointer in said each node, said back pointer pointing to an immediate predecessor node; and a node level field in said each node for recording a node level associated with said each node, said node level corresponding to the number of said forward pointers allocated to said each node.

* * * * *